US008298315B2

(12) United States Patent
Martin

(10) Patent No.: US 8,298,315 B2
(45) Date of Patent: Oct. 30, 2012

(54) USE OF LIQUID-CRYSTAL DISPLAYS, AND PROCESSES FOR THE RECYCLING THEREOF

(75) Inventor: Roland Martin, Weinheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 13/240,474

(22) Filed: Sep. 22, 2011

(65) Prior Publication Data

US 2012/0011966 A1    Jan. 19, 2012

Related U.S. Application Data

(62) Division of application No. 10/591,535, filed on Sep. 1, 2006, now Pat. No. 8,048,195.

(30) Foreign Application Priority Data

| Mar. 5, 2004 | (DE) | 10 2004 011 389 |
| Apr. 27, 2004 | (DE) | 10 2004 020 739 |
| Jun. 17, 2004 | (DE) | 10 2004 029 136 |

(51) Int. Cl.

| C22B 5/20 | (2006.01) |
| C22B 9/00 | (2006.01) |
| C22B 1/00 | (2006.01) |
| C01B 15/14 | (2006.01) |
| C01B 33/12 | (2006.01) |

(52) U.S. Cl. ............ 75/414; 75/585; 75/762; 264/911; 264/915; 423/325; 423/335; 588/400

(58) Field of Classification Search .................... 75/414, 75/585, 688, 690, 751, 762; 264/911, 915; 423/325, 335

See application file for complete search history.

(56) References Cited

U.S. PATENT DOCUMENTS

| 1,513,200 A | 10/1924 | Udy |
| 5,284,633 A | 2/1994 | Gefvert |
| 5,496,403 A | 3/1996 | Gaedcke et al. |
| 5,662,579 A | 9/1997 | Bickford |
| 2007/0193414 A1 | 8/2007 | Martin |

FOREIGN PATENT DOCUMENTS

| DE | 244 889 | 4/1987 |
| DE | 4030732 | 12/1991 |
| JP | 2000084531 | 3/2000 |
| JP | 2001198565 | 7/2001 |
| JP | 2002 346505 | 12/2002 |
| WO | WO 97/13881 | 4/1997 |
| WO | WO 03/104504 | 12/2003 |

OTHER PUBLICATIONS

T. Rosenqvist—Principles of Extractive Metallurgy—Second Edition—McGraw-Hill Book Company—pp. 294-297—1983.
S. Waltritsch—"Pyrolysis and Smelling of Printed Circuit Boards" BHM, 149. Jg. (2004), Heft 1—pp. 19-27.
IPMI—International Precious Metals Institute—"Environmentally Sound Management Used Mobile Telephones"—pp. 1-15—Issued: Jul. 14, 2003.
A History of Metallurgy—published by The Metals Society—1976—The Full Bronze Age—pp. 29-31.
WO 02/096577—English Abstract of JP 2002 346505—"Method of Collecting Glass by Reducing Environmental Load From LCD"—2002.
Merck—Verwertungsverfahren für LC-Displays—Dr. Roland Martin et al.—Mai 12, 2004 in Berlin.
MicroPatent® PatSearchFulltext: DE 4030732 A1, Processing Fluorescent Lamp Scrap—For Recycling of Glass, Mercury Phosphor, and Metals Avoiding Waste and Pollution, Published Dec. 5, 1991, 1 page.

*Primary Examiner* — Stanley Silverman
*Assistant Examiner* — Jennifer Smith
(74) *Attorney, Agent, or Firm* — Millen, White, Zelano & Branigan, P.C.

(57) ABSTRACT

The present invention relates to the use of liquid-crystal displays (LCDs), and to processes for the recycling thereof. The processes according to the invention are characterised in that the LCDs are employed at least partly as replacement for other raw materials. In general, the LCDs are thermally treated here at a temperature in the range from 900 to 1700° C.

14 Claims, No Drawings

USE OF LIQUID-CRYSTAL DISPLAYS, AND PROCESSES FOR THE RECYCLING THEREOF

This application is a divisional application of U.S. Ser. No. 10/591,535 filed Sep. 1, 2006 now U.S. Pat. No. 8,048,195.

The present invention relates to the use of liquid-crystal displays (LCDs), and to processes for the recycling thereof.

The number of LCDs produced and the average display area per display have been increasing continuously for years. Since LCDs have recently also been employed in TV sets, significant growth rates can also be expected in coming years.

Although the most important LCD applications, such as, for example, in notebooks, monitors and TV sets, are long-life products, disposal or recycling plays an ever more important role. The disposal, usual in the past, of electronic components to landfill is increasingly being replaced by recycling processes, in particular also in view of EU directive 2002/96/EC "Waste Electrical and Electronic Equipment" ("WEEE"), according to which LCDs have to be removed and disposed of or recycled.

There are three different alternatives for recycling:
1. The LCD is dismantled and the individual components are re-used for the original product (for example recovery of the liquid crystals or glass and the use thereof for the production of new LCDs).
2. The LCD is dismantled and the individual components are used in other industries or for other products.
3. Individual components, preferably removed components, of LCDs are subjected to heat recovery. In this case, for example, incineration of the plastics serves for energy recovery.

The recycling of LCD glass for the production of new LCDs is described, for example, in JP 2001/305501 A, JP 2001/305502 A, JP 2000/024613 A and JP 2001/337305 A. It is disadvantageous in this type of recycling that the glass always contains surface contamination and in addition has to be sorted on collection, which is associated both with high technical complexity and also with high costs since in general different glasses are employed for different applications. Thus, for example, soda-lime glasses, which generally melt in the region of 1000° C., are generally employed for STN (Super Twisted Nematic) LCDs, while borosilicate glasses, which generally melt in the region of 1300° C., are generally used for TFT (Thin Film Transistor) LCDs.

A special process for the disposal of LCDs is operated by the Berlin company "VICOR" in a pilot plant, in which the displays are separated manually from casing and electronic parts and the polarisation films and subsequently shredded to a size of about 1 cm (EDV, Elektronikschrott, Abfallwirtschaft 1993, pp. 231-241). The liquid crystals are then distilled off in the furnace in a nitrogen/argon atmosphere at a maximum of 400° C. and atmospheric pressure. After condensation thereof in a cold trap, they are passed to final storage in an underground landfill site. The furnace temperature must not exceed 600° C. during the treatment since otherwise, owing to the molecular structure, there is a risk of dioxin formation. The other material fractions arising, namely glass, plastic and circuit boards, as well as structural elements are processed further by conventional recycling methods. It is disadvantageous in this process that the separation of the liquid crystals, which on the one hand only make up a very small proportion by weight of the total display (about 1 kg of liquid crystals per tonne of displays) and on the other hand represent a mixture of a multiplicity of different individual substances, is technically very complex and also very expensive, especially as the liquid crystals are subsequently disposed of to landfill. Use of the recovered liquid crystals in new LCDs is uneconomic according to the state of the art today. This also applies to a further process for the extraction of liquid crystals with solvents, which is described in JP 2002/126688 A.

The plastics, such as, for example, casing parts, but also polarisation films and other films, are generally separated off and either subjected to heat recovery or used for other products. Thermal recycling of such plastics is described, for example, in JP 2002/159955 A.

Use of the individual components for other products is also known. Thus, "Straßburger Aufbereitungsgesellschaft" in Hockenheim (SAG) uses a process for blowing LCDs to give foam glass (degree project: "Recycling-verfahren für Flüssigkristalldisplays" [Recycling Processes for Liquid-Crystal Displays], Prof. Paffrath, Prof. Schön, Scala, TU-Darmstadt, 1997-98). The displays used here originate principally from production rejects. They are mixed, including the LC liquid, with flat glass and apparatus glass, shredded, ground to dust fineness with a particle size of 40 µm and mixed with a blowing agent. Foam-glass beads having a diameter of from about 5 to 15 mm are subsequently blown at from 800 to 850° C. The finished material is similar to the known expanded clay from hydrocultures and can be used as lightweight aggregate, as filler, as heat insulation material, as carrier granules or as absorption material in the construction industry, in horticulture and landscaping and in waste water technology.

Further processes for the removal of polarisation films by mechanical removal, incineration or gasification, with subsequent comminution of the glasses and the use thereof as glass substitute are described in JP 2001/296508 A and JP 2001/296509 A. The disadvantage of these processes is that the glasses obtained therefrom are highly contaminated and differ greatly in composition. They can therefore only be employed for low-value applications.

Thus, JP 2000/084531 A describes a process for the recycling of LCDs in which the LCDs are firstly comminuted to particle sizes of less than 10 mm. The particles comminuted in this way are subsequently employed in smelting furnaces at 1200° C. for the removal of iron. Disadvantageous in this process are, in particular, the complex comminution of the LCDs to particle sizes of less than 10 mm and the restricted use for the removal of iron.

In addition, energy consumption is increasing continuously, and great efforts are being made worldwide to save energy. In particular in industrial production, it is being attempted, in particular, to reduce costs and/or energy consumption by process simplifications, heat recovery and/or through the replacement of raw materials.

On the basis of the known prior art, one of the objects of the present invention was therefore to search for economical processes for the recycling of LCDs which do not have the disadvantages known from the prior art. In particular, the complex separation of the liquid crystals and/or the polarisation films and the complex sorting of the displays into different types of glass were to be avoided, taking into account the energy efficiency of the process. A further object of the present invention was to provide novel potential uses of LCDs.

Surprisingly, it has been found that it is possible to subject LCDs to material recycling in a simple and in addition economical process.

The present invention thus relates to a process for the material recycling of LCDs which is characterised in that the LCDs are at least partly, preferably completely, employed as replacement for other raw materials. In general, the LCDs are thermally treated here at a temperature in the range from 900 to 1700° C., preferably from 1000 to 1400° C. and particularly preferably from 1200 to 1400° C. The thermal treatment here is carried out, in particular, at temperatures above 1200° C. and thus at temperatures at which even high-quality borosilicate glasses melt.

The term LCD in the present application is taken to mean a display which, besides two glass plates, may also comprise at least the materials arranged between the two glass plates, such as, for example, liquid crystals, transparent films and adhesives, as well as electronic components connected to the display (for example electrodes). The plastic casing, the backlighting and, where appropriate, the polariser films are generally separated off in advance and recycled separately. However, they can also be recycled directly with the other components in the process according to the invention.

LCDs consist essentially of from 30 to 99.8% by weight of glass and from 0 to 60% by weight of plastic film, and from 0.1 to 20% by weight of electronics and liquid crystals.

In the process according to the invention, the LCDs employed are preferably used LCDs and LCDs from production rejects.

The term thermal treatment in the present application is taken to mean the treatment of LCDs with supply of energy through energy carriers, such as, for example, gas, coal and oil, and/or utilising the heat energy present in the LCDs. The thermal treatment is usually carried out in thermal treatment plants, such as, for example, power stations, gasification plants and incinerators, preferably incinerators, with the equipment necessary for this purpose, such as, for example, fixed furnaces, smelting furnaces, open-hearth furnaces or rotary-tube furnaces.

In a first preferred embodiment, the LCDs are employed without comminution. It is advantageous in this embodiment that comminution of the LCDs, which is associated both with an additional technical complexity and with additional costs, can be omitted. In a second preferred embodiment, the LCDs are comminuted. However, the nature and size of the comminution is not important here. Thus, the LCDs can either be broken, shredded or ground. Depending on the nature of the comminution, the average size of the fragments here is in the region of decimeters (in the case of breaking), in the region of centimeters (in the case of shredding) and in the region of millimeters (in the case of grinding).

The process according to the invention has the advantage that the complex separation of the liquid crystals is superfluous and that at the same time the risk of the formation of toxic products, such as, for example, dioxin, is avoided since all organic products are destroyed at the high temperatures of the process according to the invention.

A further advantage of the process according to the invention is that the starting material can be employed in ground, shredded, broken and/or uncomminuted form.

In addition, the process according to the invention is an economical process in which, in addition, material and, where appropriate, additionally also at least partial thermal recycling of the LCDs takes place.

The material and, where appropriate, additional, at least partial thermal recycling according to the invention can be carried out here in various preferred embodiments.

In a first preferred embodiment, the LCDs are melted selectively at a temperature in the range from 900 to 1400° C., preferably from 1200 to 1400° C. In this way, it is possible for even different types of glass, as employed in the production of the displays, to be recycled together. The glass is recovered in pure form, albeit partly as a mixture of soda-lime glass and borosilicate glass. In addition, the metal parts originating, for example, from the electrodes settle in this embodiment and can be separated from the glass melt.

The procedure for carrying out selective melting processes in which the temperature is increased successively and firstly the low-melting and then the higher-melting parts are melted is known to the person skilled in the art.

The products obtained in this way are used in the building materials industry or in road construction, for example as insulating material or as bulking material.

In a second preferred embodiment, the LCDs are mixed with other metal-containing products, such as, for example, metal-containing sludges and/or catalysts, and thermally treated at a temperature in the range from 1200 to 1400° C., preferably from 1250 to 1350° C.

The proportion of LCDs in the mixture as a whole here is preferably in the range from 5 to 50% by weight.

In this embodiment, the LCDs are employed in order to bind the non-noble metals, such as, for example, iron, lead, zinc and tin, present in the metal-containing products and to separate them from the noble metals. The noble metals in the present application include both the noble metals in the narrower sense, such as, for example, gold, silver, platinum, mercury, rhenium, ruthenium, rhodium, palladium, osmium and iridium, and also the seminoble metals nickel, copper and cobalt. The mixture is preferably melted in melting crucibles, smelting furnaces or rotary-tube furnaces and then poured into crucibles. After cooling, the melt is broken. The lower part is metal-containing and essentially comprises the noble metals, whereas the upper part comprises the slag with the non-noble metals. The part comprising the noble metals is passed to metal recovery, and the slag comprising the non-noble metals is used, for example, in road construction.

This embodiment has the advantage of economic efficiency since the LCDs in this embodiment replace at least some of the furnace sand usually employed, which necessarily has to be added in this process in order to bind the non-noble metals. In addition, at least some, preferably all, of the electronic components of the LCDs can also be recycled in this embodiment since, as explained above, separation and recovery at least of the noble metals take place.

A further significant advantage is the high energy input through the plastic films present in the LCDs. This will be shown by the following calculation:

Typically, 1 tonne of LCDs is composed of:

| | |
|---|---|
| 830 kg of glass | (83% by weight) |
| 149 kg of plastic film | (14.9% by weight) |
| 20 kg of electronic components | (2% by weight) and |
| 1 kg of liquid crystals | (0.1% by weight). |

This gives rise to the following energy consideration, in which only the glass and plastic fractions are taken into account:

Thus, for example, the calorific value of PE film is 46,000 kJ/kg. 150 kg of plastic film give rise to a calorific value of 6,900,000 kJ. The energy requirement for melting 1 kg of used glass is in the range from 3000 to 6500 kJ. Accordingly, melting 830 kg of glass requires 2,490,000 to 5,395,000 kJ.

As this illustrative energy consideration shows, the calorific value of the plastic films exceeds the energy requirement for melting the glass, i.e. a plastic proportion of only 15% by weight is sufficient to melt the LCD glass. Consequently, no additional energy requirement is theoretically necessary.

In addition, the energy input increases further with increasing plastic proportion, advantageously through introduction of the plastic casing too.

For the above-described process according to the invention for the recovery of noble metals, the use of LCDs as raw material and/or added material thus additionally gives rise to a reduction in the requisite energy, i.e. an energy saving compared with the use of furnace sand.

A further advantage of this embodiment is the fact that the plastic films present in the LCDs can be employed as reducing agent in order to reduce the metal-containing products. In the reductive melting of metal-containing ores or products for the recovery of crude metals, carbon-containing products, such as, for example, coal, are generally added. This is because the metals would be oxidised at the high melt temperatures without the addition of reducing agents and would first have to be reduced back to metals in an additional production step. The use of the carbon-containing plastic films present in the LCDs thus enables at least some, preferably all, of the carbon-containing products usually added as reducing agent in this process to be replaced or saved.

In a third preferred embodiment, the LCDs are thermally treated as raw material and/or added material in rotary-tube furnaces at a temperature in the range from 1100 to 1300° C., preferably from 1150 to 1250° C. The thermal treatment of the LCDs in rotary-tube furnaces preferably results in the formation of a protective film on the inner lining thereof.

The proportion of LCDs as raw material and/or added material in the composition as a whole is preferably in the range from 1 to 20% by weight here.

Rotary-tube furnaces generally have a chamotte lining, which is attacked by aggressive gases and substances during the incineration of industrial waste. Consequently, these chamotte bricks have to be replaced at regular intervals. The addition of silicate-containing products, such as, for example, sand, enables a protective film to form on the walls, which considerably increases the life of the chamotte lining.

Surprisingly, it has now been found that LCDs can also be used instead of the silicate-containing products and likewise result in the formation of a protective film on the chamotte lining. In this way, it is possible to employ LCDs in the rotary-tube furnaces as replacement materials for purchased silicate-containing products, such as, for example, furnace sands. The use of the LCDs also results in this embodiment in a reduction in the requisite energy, since the calorific value of the plastic films can also be utilised in this embodiment for melting the LCD glass.

The present invention thus also relates to the use of LCDs in thermal treatment plants.

In the use according to the invention, the LCDs employed are preferably used LCDs and LCDs from production rejects.

In a preferred embodiment, the LCDs are employed as raw material and/or added material in thermal treatment plants. Particular preference is given to the use of LCDs in thermal treatment plants, in particular rotary-tube furnaces, for the formation of a protective film on the inner lining thereof.

In a further preferred embodiment, the LCDs are employed as energy supplier in the thermal treatment plants.

The present invention furthermore relates to the use of LCDs in metal recovery. In a first preferred embodiment, the LCDs are employed as raw material and/or added material in metal recovery. However, preference is furthermore also given to the use of the LCDs as energy supplier in metal recovery.

Particular preference is given to the use of the LCDs in the recovery of noble metals from compositions comprising a mixture of non-noble and noble metals. These compositions can be either naturally occurring products, such as, for example, ores, or industrial products, such as, for example, catalysts, electrical or electronic scrap, metal-containing sludges and other compositions comprising a mixture of noble and non-noble metals. In particular, the LCDs are used here as raw material and/or added material employed, at least partly, instead of the furnace sand usually employed and/or the carbon-containing products employed.

The present invention is described in greater detail below with reference to working examples, but without being restricted thereto.

EXAMPLE 1

Selective Melting

In each case, an STN-LCD and a TFT-LCD, consisting of the two glass plates, the two polarisation films and the liquid crystals, including coatings, are comminuted separately to a size of from about 1 to 3 cm. In each case, 100 g of each fraction are weighed out and subsequently mixed. An aluminium-oxide gutter is attached at an angle of 20°, and the mixture is introduced onto the higher-lying part. Slow heating to 1400° C. is carried out using an oxygen burner. Individual parts of the LCDs begin to melt from 950° C. with vigorous evolution of fumes and burning of the polarisation film and flow downwards in the gutter. The remainder only starts to melt at 1200° C. and flow downwards in the gutter. By adroit collection of the fractions, about 40% of STN glass, 40% of TFT glass and 20% of a fraction comprising a mixture of STN and TFT glass can be obtained.

EXAMPLE 2

Metallurgy

The experiments are carried out in a horizontally lying, gas-fired furnace having a diameter of about 3.5 m and a length of 4 m.

The LCD mixture employed in these experiments consists of about 40% of TFT-LCDs and about 60% of STN-LCDs. The LCDs are mostly in unbroken form and also partly—due to transfer operations—in broken form, i.e. in sizes of from 10 to 50 cm in diameter. In some cases, the electronics are still present on the LCDs. The LCDs originate essentially from electrical recycling companies who have dismantled, collected and stored the LCDs.

Using a bucket wheel loader, the metal scrap, the LCD mixture, the furnace sand and the added materials, including coal, are introduced into a mixer with internal blades having a capacity of about 10 m$^3$ and mixed slowly. The precise compositions are described in Table 1. During this mixing operation, the LCDs break at least partly, so that the majority of the LCDs after mixing have a size of from 3 to 30 cm. The mixture is then introduced continuously via a conveyor belt into the furnace pre-heated to about 500° C. and heated to about 1350° C. over the course of several hours and melted. The melt is then discharged into a steel vessel or brick-lined trough. After cooling, the metal fraction with the noble metals from the metal scrap and the copper components present in the electronics can easily be separated from the slag, which comprises the glass fraction of the LCDs, the added furnace sand and the added materials, by knocking.

The slag obtained meets all demands of road construction.

The following experiments are carried out:

TABLE 1

| Experiment No. | Metal scrap [kg] | LCDs [kg] | Furnace sand [kg] | Added materials [kg] | Total amount [kg] |
|---|---|---|---|---|---|
| 1 | 3000 | 300 | 850 | 650 | 4800 |
| 2 | 3000 | 600 | 600 | 600 | 4800 |
| 3 | 3000 | 900 | 350 | 550 | 4800 |
| 4 | 3000 | 1200 | 100 | 500 | 4800 |
| 5 | 3000 | 1350 | 0 | 450 | 4800 |

EXPERIMENT 6

4.8 t of the mixture of the composition in experiment 2 are introduced as a mixture completely into the cooled furnace and then slowly heated to 1300° C. The soot forming in part is burnt directly at the same time through the addition of oxygen to the heating gas. No difference compared with experiments 1 to 5 is observed with respect to the metal fraction and the slag formation.

EXPERIMENT 7

600 kg of the above LCDs, 3000 kg of metal scrap, 600 kg of furnace sand and 600 kg of added materials are introduced as individual components completely into the cooled furnace and then slowly heated to 1300° C. The introduction only breaks the larger LCDs, while the smaller ones are only broken to an insignificant extent. The soot forming in part is burnt directly at the same time through the addition of oxygen to the heating gas. No difference compared with experiments 1 to 5 is observed with respect to the metal fraction and the slag formation.

EXPERIMENT 8

4.8 t of the mixture of the composition in experiment 2 are introduced as a mixture completely into the cooled furnace and then slowly heated to 1400° C. The soot forming in part is burnt directly at the same time through the addition of oxygen to the heating gas. No difference compared with experiments 1 to 5 is observed with respect to the metal fraction, and the slag formation is assessed subjectively as somewhat glass-like.

EXAMPLE 3

Industrial Waste Incinerator 176 (120 l) drums each containing about 100 kg of LCDs, i.e. in total about 18 t of LCDs, are employed. The LCDs here are mostly in unbroken form, i.e. in sizes of from 10 to 50 cm in diameter. The mixture here consists of about 70% of TFT-LCDs and about 30% of STN-LCDs. In some cases, the electronics are still present on the LCDs. The LCDs originate essentially from electrical recycling companies who have dismantled, collected and stored the LCDs.

The industrial waste to be incinerated, such as, for example, acids, contaminated organic solvents or solids, is incinerated in a large industrial-waste rotary-tube incineration furnace having a diameter of 3.5 m and a length of 11 m using gas at temperatures of from about 1200 to 1300° C. The industrial waste present in the drums and the LCDs are introduced into the upper part of the furnace by means of a grab. Since the furnace is kept constantly at a temperature of from 1200 to 1300° C., the drums burst immediately on introduction. The LCDs are introduced continuously over a period of 24 hours instead of the silicon- or silicate-containing substances otherwise used, such as furnace sand or glass. The silicon- or silicate-containing substances form a protective slag skin (=protective layer) on the brick lining of the rotary-tube furnace and thus protect the wall against chemical attack and rapid wear. The quality of the protective slag skin is assessed visually. The slag skin formed by the LCDs introduced into the incineration furnace does not differ from the slag skin formed by the silicon- or silicate-containing substances otherwise usually employed.

The invention claimed is:

1. A process for the material recycling of LCDs, comprising replacing raw materials other than LCDs at least partly by LCDs in a material recycling process, wherein the LCDs are thermally treated as raw material or added material in a rotary-tube furnace at a temperature in the range from 1100 to 1300° C., wherein the proportion of LCDs as raw material or added material in a composition comprising said LCDs and raw materials other than LCDs is 1 to 20% by weight.

2. A process according to claim 1, wherein the LCDs as raw material or added material result in the formation of a protective film on the inner lining of the rotary-tube furnace.

3. A process according to claim 1, wherein the raw material in the material recycling process comprises silicate-containing compounds and said LCDs replace at least some of said silicate-containing compounds.

4. A process according to claim 3, wherein the silicate-containing compounds comprise furnace sand.

5. A process according to claim 1, wherein the LCDs are thermally treated as raw material or added material in a rotary-tube furnace at a temperature in the range from 1150 to 1250° C.

6. A process according to claim 1, wherein the LCDs are thermally treated as raw material or added material in a rotary-tube furnace at a temperature in the range from 1200 to 1300° C.

7. A process according to claim 1, wherein the LCDs are thermally treated as raw material or added material in a rotary-tube furnace at a temperature of 1100° C.

8. A process according to claim 1, wherein the LCDs are thermally treated as raw material or added material in a rotary-tube furnace at a temperature of 1300° C.

9. A process according to claim 1, wherein the LCDs are thermally treated as raw material or added material in a rotary-tube furnace at a temperature of 1200° C.

10. A process according to claim 1, wherein no furnace sand is added to the rotary-tube furnace.

11. A process according to claim 1, wherein the LCDs are in ground, shredded or broken form.

12. A process for the material recycling of LCDs, comprising replacing raw materials other than LCDs at least partly by LCDs in a material recycling process, wherein the LCDs are thermally treated as raw material or added material in a rotary-tube furnace at a temperature in the range from 1100 to 1300° C., wherein the LCDs are in un-comminuted form.

13. A process according to claim 12, wherein the proportion of LCDs as raw material or added material in a composition comprising said LCDs and raw materials other than LCDs is 1 to 20% by weight.

14. A process for the material recycling of LCDs, comprising replacing raw materials other than LCDs at least partly by LCDs in a material recycling process, wherein the LCDs are thermally treated as raw material or added material in a rotary-tube furnace at a temperature in the range from 1100 to 1300° C., wherein the LCDs are in unbroken form.

* * * * *